United States Patent
Kaufman

(10) Patent No.: US 11,946,679 B1
(45) Date of Patent: Apr. 2, 2024

(54) EXHAUST GAS HEAT RECOVERY FROM CRYO-COMPRESSION ENGINES WITH COGENERATION OF CRYO-WORKING FLUID

(71) Applicant: Jay Stephen Kaufman, Kingston, NH (US)

(72) Inventor: Jay Stephen Kaufman, Kingston, NH (US)

( * ) Notice: Subject to any disclaimer, the term of this patent is extended or adjusted under 35 U.S.C. 154(b) by 0 days.

(21) Appl. No.: 18/241,935

(22) Filed: Sep. 4, 2023

Related U.S. Application Data

(63) Continuation-in-part of application No. 18/087,849, filed on Dec. 23, 2022, now Pat. No. 11,780,312.

(51) Int. Cl.
| | |
|---|---|
| F25B 9/00 | (2006.01) |
| F01N 3/02 | (2006.01) |
| F01N 5/02 | (2006.01) |
| F02B 37/00 | (2006.01) |
| F02G 1/02 | (2006.01) |
| F02G 5/02 | (2006.01) |
| F25B 27/02 | (2006.01) |

(52) U.S. Cl.
CPC ............ *F25B 9/004* (2013.01); *F01N 3/0205* (2013.01); *F01N 5/02* (2013.01); *F02B 37/00* (2013.01); *F02G 1/02* (2013.01); *F02G 5/02* (2013.01); *F25B 27/02* (2013.01); *F25B 2321/0022* (2013.01)

(58) Field of Classification Search
CPC .. F25B 9/004; F25B 27/02; F25B 2321/0022; F01N 3/0205; F01N 5/02; F02B 37/00; F02G 1/02; F02G 5/02
See application file for complete search history.

(56) References Cited

U.S. PATENT DOCUMENTS

| | | | |
|---|---|---|---|
| 11,780,312 B1 * | 10/2023 | Kaufman | F25J 1/0235 60/651 |
| 2013/0312408 A1 * | 11/2013 | Murata | F02B 37/00 60/605.1 |
| 2015/0120166 A1 * | 4/2015 | Fisher | B61C 17/02 701/1 |
| 2019/0063685 A1 * | 2/2019 | Sinatov | F25J 1/0251 |
| 2020/0056511 A1 * | 2/2020 | Conlon | F01K 7/02 |
| 2020/0400372 A1 * | 12/2020 | Castellucci | F02C 6/16 |
| 2022/0320555 A1 * | 10/2022 | Kaufman | F22B 1/006 |

* cited by examiner

*Primary Examiner* — Hoang M Nguyen
(74) *Attorney, Agent, or Firm* — McLane Middleton, Professional Association

(57) ABSTRACT

The present invention provides a working fluid re-liquefaction system driven by recovered exhaust gas energy of a prime mover with heat rejection via a magneto-caloric liquefier to atmosphere for distributed electric generation and motor vehicle application.

17 Claims, 4 Drawing Sheets

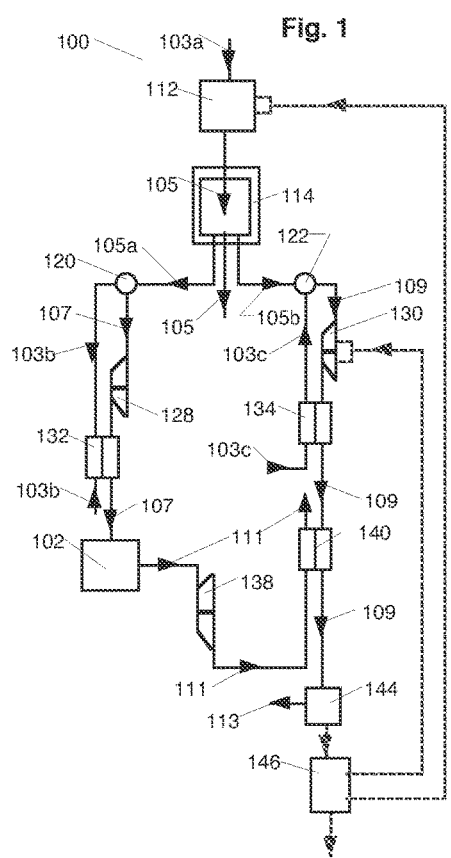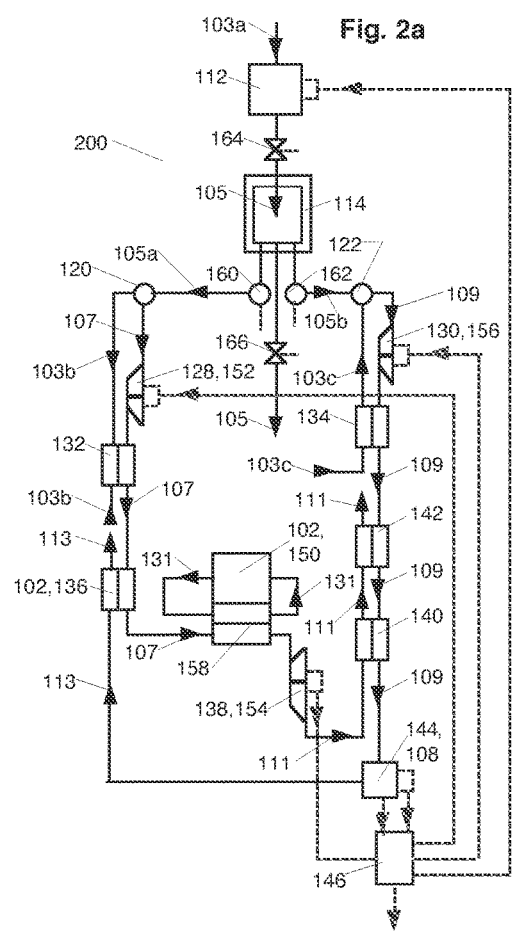

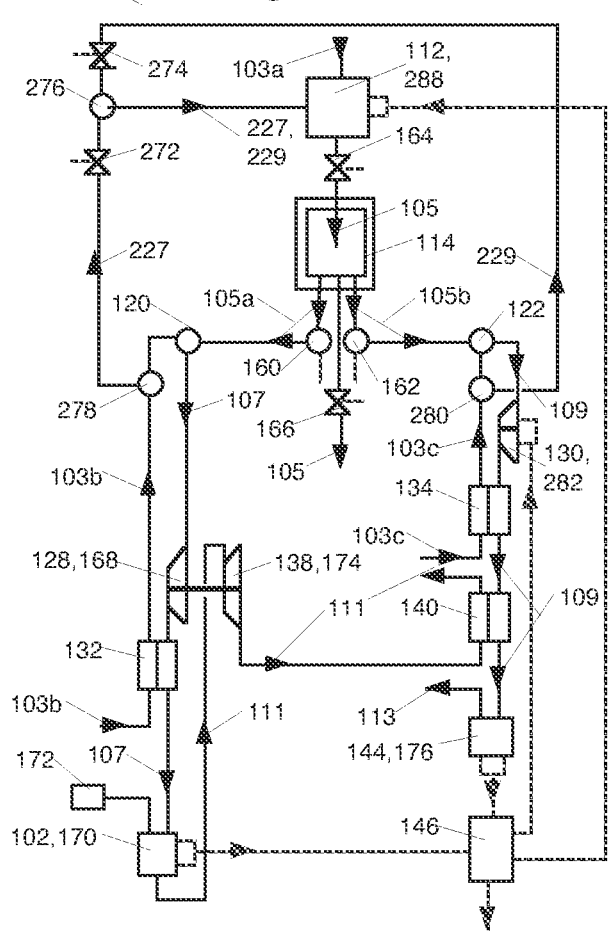

EXHAUST GAS HEAT RECOVERY FROM CRYO-COMPRESSION ENGINES WITH COGENERATION OF CRYO-WORKING FLUID

CLAIM OF PRIORITY

This application is a continuation in part and claims the benefit of priority of co-pending U.S. patent application Ser. No. 18/087,849, filed on Dec. 23, 2022.

FIELD OF THE INVENTION

The present invention relates to exhaust gas energy recovery from a prime mover by a parallel arrangement of cascaded flow paths with engines and heat exchangers, a portion of which drives a cryo-liquefier with heat rejection from an active magnetic regenerator, and specifically relates to such liquefiers supplying liquid air to a cryogenic heat sink of prime movers in electric generation and motor vehicle application.

BACKGROUND

Since the 1970's a high efficiency prime mover with renewable energy storage has been a goal of motor vehicle and distributed electric generation design to provide energy independence, conserve fossil fuels, and reduce emission of combustion products. This has led to an increased need for clean and reliable energy storage devices, which can store the power generated, and make it readily available when needed in a wide range of applications. As fossil fuels are consumed more rapidly than they can be produced, an "energy crisis" has emerged and there is a widely recognized need to develop new energy technologies. Moreover, the products of combustion are both unhealthy and dangerous for the environment, while the gradual increase in temperature of the earth's atmosphere, or "greenhouse effect", advises development of energy technology that minimizes the release of heat and greenhouse gases. Some examples of technologies that exploit natural "clean" energy sources include solar photo-voltaic panels, wind turbines, motor vehicle regenerative braking, and fuel cells. Other, yet undeveloped technologies, include structure and motor vehicle draft recovery, advanced refrigerant liquefaction for heat sink cooling, and application of synfuel gasification to production of hydrogen and cryo-sink refrigerant.

Energy storage of solar, wind, and other intermittent sources, has in general, been dominated by advanced batteries. Batteries are resource intensive to manufacture; have a limited number of charge cycles; and present an unprecedented fire hazard. Other storage concepts under development, such as super capacitors, flywheels, and compressed air are too expensive, hazardous and/or inefficient. Renewable fuels, such as compressed hydrogen, liquid natural gas, and bio-fuels are useful for extended unavailability of intermittent energy sources, but are in limited use. Hydrogen is produced inefficiently by electrolysis of water or steam reforming of methane from natural gas, which is available via the environmentally controversial fracking process. Because hydrogen is burned in inefficient converters, on-board vehicle storage is problematic and high pressures must be employed. While carbon from production of synthetic fuels may be captured for sequestration, combustion of these fuels normally discharges carbon dioxide to the atmosphere.

Phase change of liquid air or nitrogen is a promising alternative storage means, for both electric generation and motor vehicles. Specific storage capacity is equal to fuel saved due to cryo-compression per unit weight or volume of refrigerant plus container. The liquid or solidified gas is referred to hereinafter as heat sink refrigerant produced by refrigerant liquefaction. A "liquid nitrogen economy" has been proposed [Kleppe, J. and Schneider, R., "A Nitrogen Economy", ASEE, 1974] and some high pressure engines with phase change storage using cryogenic compression have been tested. These include a fired turbine [Kishimoto, K. et-al, "Development of Generator of Liquid Air Storage Energy System", Mitsubishi Tech. Review Vol. 35-3, 1998] and two fuel-less reciprocating engines [Knowlen, C. et-al, "High Efficiency Energy Conversion Systems for Liquid Nitrogen Automobiles", U. of Washington, SAE 981898, 1998] and [Ordonez, C. et-al, "Cryogenic Heat Engine for Powering Zero Emission Vehicles", ASME Intl. Mech. Engineering Congress & Expo., 2001]. More recently, phase change storage is gaining acceptance in the United Kingdom as indicated by an operating 300 kW pilot plant and a fuel-less liquid nitrogen engine for compact urban vehicles [Center for Low Carbon Futures, "Liquid Air in the Energy and Transport Systems", ISBN:978-0-9575872-2-9, 2013]. In these prime movers, low compression work is attained by incompressible working fluid. Consumption of refrigerant is excessive in these high pressure engines (40 to 80 bar), which are not optimized, nor supplemented by recovered energy. Two improved cryo-compression engines have been proposed. These are a closed cycle with ambient heat source and quasi-isentropic cryo-compression sink [Ordonez, C., "Liquid Nitrogen Fueled, Closed Brayton Cycle Cryogenic Heat Engine", Energy Conversion & Management 41, 2000], and an open cycle with over ambient heat source and quasi-isothermal cryo-compression sink as disclosed in the inventor's U.S. Pat. No. 7,854,278. Both concepts would economize refrigerant consumption and profoundly impact design and production capacity of refrigerant condensation facilities.

Refrigerant liquefaction to supply early stage cryo-compression engines is primarily by various standard expansion-cooling cycles. These are powered primarily from the electric grid at low cost off-peak time. Inherent disadvantages of this power source include transmission loss, transport of the refrigerant and perpetuation of the environmental downside of centralized fossil fuel and nuclear use. Large central expansion-cooling liquefiers are attaining efficiency of about 50%. This requires complex equipment with features, however, such as pre-cooling, multi-stage expansion and sub-cooling to a lower temperature sink, such as with liquid natural gas during distribution. These features are not economical in smaller distributed applications, leading to higher liquefier power requirements. On-board motor vehicle refrigerant liquefaction is considered to be impractical due to low liquefaction efficiency.

It is important to minimize refrigerant consumption. Moreover, it is recognized that advanced liquefier concepts are required for smaller scale distributed use in conjunction with universally available renewable energy to drive refrigerant liquefaction in both stationary and motor vehicle application. Two promising prior art liquefiers with application to cryo-compression engines are under development. These are magneto-caloric refrigeration, [Matsumoto, K. et al, "Magnetic Refrigerator for Hydrogen Liquefaction, J. of Physics: Conf. Series 150, 2009], and thermo-acoustic refrigeration [Wollan, J. et al, "Development of a Thermoacoustic Natural Gas Liquefier", Los Alamos Natl. Lab., LA-UR-02-1623, AIChE, 2002]. An undeveloped prior art liquefier concept is sub-cooling of an air liquefier by available cryo-liquid from a gasifier, as disclosed in the inventor's U.S. Pat. Nos. 10,343,890 and 10,384,926 for examples, or liquefied natural gas facility during vaporization for distribution. Prior art renewable energy power sources adaptable to refrigerant liquefaction for general use include solar, wind and process heat and pressure recovery. Motor vehicle regenerative braking due to deceleration is a developed technology, potentially supplemented by photovoltaic solar recovery, for on-board liquefaction. Regenerative braking potential is partially lost due to compression heating in reciprocating engines. Solar recovery to motor vehicles is limited by available capture area and photovoltaic panel efficiency. Three undeveloped prior art liquefier power source concepts are energy recovery of wind, motor vehicles, and fuel synthesis for distributed and mobile applications, as disclosed in the inventor's U.S. Pat. Nos. 9,395,118; 7,854,278; and 10,343,890, respectively.

SUMMARY OF INVENTION

There are two main embodiments of the engine of the present invention for distributed electric generation and motor vehicle application. While one of at least ordinary skill in the art will recognize that some features of the main embodiments may be substituted, these are the preferred versions.

The object of the present invention is, therefore, to provide a prime mover (multiple expansion engines) with capability to recover heat and pressure from an originating energy source such as a fuel gasifier, solar concentrator, nuclear reactor, fuel cell or combustion engine to a cascaded arrangement of two or more expansion engines.

It is a further aspect of the present invention to provide a prime mover (multiple expansion engines) with capability to recover pressure from an originating energy source such as the fuel of a fuel cell or combustion engine to a cascaded arrangement of two or more expansion engines.

It is a further aspect of the present invention to provide phase change energy storage by co-generating liquefied air or re-liquefied (less specific energy) air, to cool heat sink working fluid, thus enabling cryo-compression and increasing overall operating temperature difference of a prime mover.

It is a further aspect of the present invention to recover exhaust heat discharging from an expansion engine to cryogenically compressed intake air entering an adjacent expansion engine.

It is a further aspect of the present invention to recover exhaust pressure discharging from a first expansion engine to drive cryo-compression of expansion engine working fluid.

It is a further aspect of the present invention to co-generate production of liquefied air by load shifting between a prime mover and the drive of an air liquefier of a stationary prime mover or a motor vehicle.

It is a further aspect of the present invention to co-generate re-liquefaction of liquefied air used to provide cryo-compression of the working fluid of a prime mover.

It is a further aspect of the present invention to provide exhaust gas energy recovery from a prime mover by a parallel arrangement of at least two cascaded flow paths, each with a cryo-air supply, an engine and at least one heat exchanger, a portion of which drives a cryo-gas liquefier with heat rejection from an active magnetic regenerator.

It is a further aspect of the of the present invention to provide phase change energy storage by co-generating and storing liquid air to cool heat sink working fluid, thus enabling cryo-compression and increasing overall operating temperature difference of a prime mover.

It is a further aspect of the present invention to provide a magneto-caloric gas liquefier based on an active magnetic regenerator (AMR) cycle with capability to absorb and reject latent heat of the working fluid of a prime mover.

It is a further aspect of the liquefier of the present invention to provide a pressurized flow path to, in turn, expansion cool the pressurized atmospheric air, absorb latent heat from an AMR cycle, and reject the latent heat to atmosphere.

It is a further aspect of the liquefier of the present invention to provide sub-ambient cooling of low pressure incoming air to depressurized discharging air via a rotary regenerator.

It is a further aspect of the present invention to recover pressure of exhaust gas discharging from a prime mover to drive compression of atmospheric air in a liquefier heat rejection flow path.

It is a further aspect of the liquefier of the present invention to supplement cooling of the expansion cooled atmospheric air with cryogenic hydrogen fuel of a prime mover prior to absorption of the latent heat of liquefying air into the heat rejection flow path.

It is a further aspect of the present invention to co-generate production of liquefied air by load shifting between a prime mover and the drive of an air liquefier in stationary and motor vehicle application, which supports the added liquefier power at higher engine-generator efficiency.

These aspects of the invention are not meant to be exclusive and other features, aspects, and advantages of the present invention will be readily apparent to those of ordinary skill in the art when read in conjunction with the following description, accompanying figures and claims.

DRAWING FIGURES

FIG. 1 is a schematic illustrating a basic energy recovery system for recovering energy from the exhaust gas of cryo-compression expansion engines.

FIG. 2a is a schematic illustrating heat recovery from a sequential arrangement of expansion engines energized by a common heat source.

FIG. 2b is a schematic illustrating pressure and heat recovery from a sequential arrangement of expansion engines energized by a common heat source.

DETAILED DESCRIPTION

Figures 4, 5:
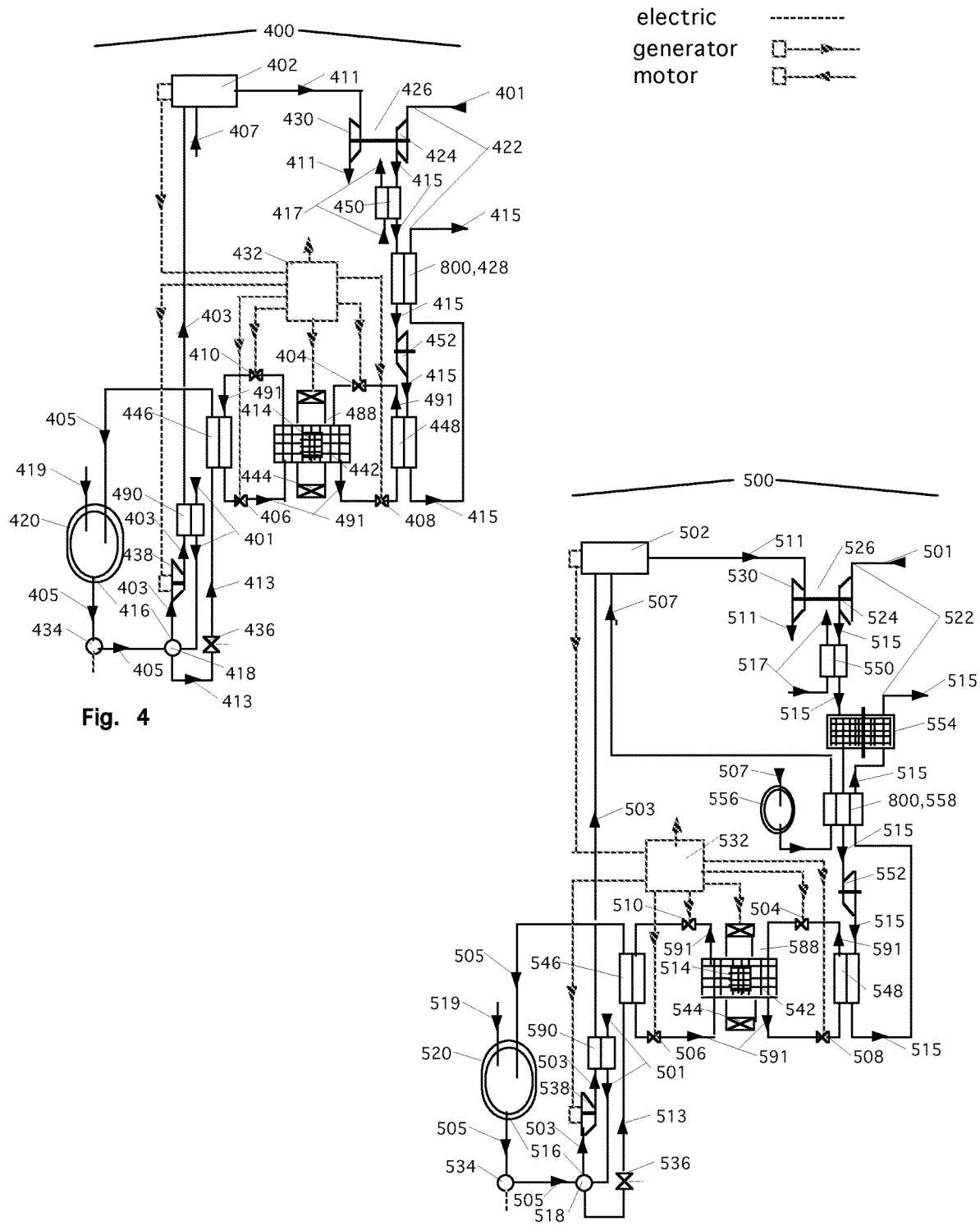
FIG. 4 is a schematic illustrating turbo-charger driven liquefaction of working fluid in a hybrid magneto-caloric/compression-expansion process.
FIG. 5 is a schematic illustrating supplemental cryogenic cooling of air by hydrogen fuel with final heat rejection via a rotary regenerator.

As a preface, it should be noted that all physical components are referred to with an even reference number and all fluid compounds that move amongst the physical components are referred to with an odd reference number. In FIGS. 4 and 5, the first digit of a reference number indicates the figure number of the system depicted in that figure, and the second and third digits indicate the component or fluid, which are similar.

Components with heat exchange properties are depicted as bisected boxes, generally depicting colder pressurized and hotter non-pressurized flow paths. It will be understood from the description that these components gain heat from one fluid and provide heat to another fluid, where the fluids are not likely to mix. Heat exchangers, including coolers, are of two types, recuperative and regenerative. A recuperator retains each fluid in separated channels and is depicted as bisected boxes, generally depicting colder pressurized and hotter non-pressurized flow paths. A fixed matrix regenerator retains heat of the hotter fluid in a metallic matrix for transfer, with some leakage, to the colder fluid, and is depicted as a rectangular matrix, i.e. regenerator matrices 442, 542, discussed below. A rotary regenerator retains heat of the hotter fluid in a metallic matrix for transfer, with some leakage, to the colder fluid, and is depicted as a rectangular matrix with an axis, i.e., rotary regenerator 554, discussed below.

Dashed lines indicate an electrical communication between relevant components and do not include reference numbers. This is as opposed to lines between components where an arrow is labeled with a reference number, which indicates a specific fluid and that fluid's direction. In FIG. 2b, cross-hatching indicates mechanical communication between two rotors. When it is noted that a component is disposed between two other components, this disposition indicates the position of the various components on the fluid's path, not necessarily the actual spatial position of the components.

The term re-liquefier or re-liquefaction is used to refer to rejection of latent heat of a portion of the working fluid at cryogenic temperature, not necessarily the same portion. It is noted that when a specific model or distributor of a system or component is included, this inclusion is merely exemplary and substitution of comparable systems or components may occur. For example, production of liquid air for cryo-compression of a prime mover system may be powered by exhaust gas of that system including a fuel cell, a spark ignition engine, a compression ignition engine, an external heat source engine or a gas turbine. An exemplary component may include substitution of a throttling nozzle for an expansion turbine. A prime mover is included in the air liquefaction system because energy is recovered from it to power air liquefaction. Finally, it is noted that one of at least ordinary skill in the art will recognize that alternate fluids may be substituted.

Referring first to FIG. 1, a schematic of the most basic form of energy recovery system 100 is provided. Energy recovery system 100 includes an air liquefier 112; dewar 114; first cryo-mixing junction 120; first cryo-recuperator 132; first cryo-compressor 128; second cryo-mixing junction 122; second cryo-recuperator 134; second cryo-compressor 130; at least one energy source 102; engine 138; engine recovery heat exchanger 140; engine driven generator 144; and electric regulator 146. The at least one energy source 102 is preferably one of a fuel gasifier, nuclear reactor, solar concentrator, or fuel cell.

Cryo-recuperators are heat exchangers that recover heat internally from the intake to the discharge flow of an associated cryo-compressor. Cryo-compressors compress a mixture of liquid air and atmospheric air cooled by vaporizing liquid air. Two types of cryo-compressors are discussed herein, a turbine driven cryo-compressor and an electric driven cryo-compressor. Recovery heat exchangers transfer heat between components in external flow paths. Turbines are devices that transform rotational energy from a fluid that is picked up by a rotor system into useable work or energy. As specified herein for various embodiments of system 100, a turbine may be, for example, a turbine-generator or a compressor drive turbine. A generator is a device that converts mechanical energy to electricity and may be, for example, an engine driven generator. An electric regulator, as used herein is a hub through which electricity is directed to various components.

The fluid that moves between the various components of energy recovery system 100 is air. As described below, several modifications of the term "air" will be provided, e.g., liquid air 105, primary air 111, secondary exhaust air 113, and oxygen depleted air due to boil-off or chemical reaction. In addition, letters may be added to a designation to indicate different portions of the same type of air, e.g., first and second portions of liquid air 105a, 105b. It is understood that these various air designations merely distinguish the same basic working fluid in different states (e.g. liquid versus gas) and different production methods (e.g. primary air 107 as a product of mixing liquid air 105a and atmospheric air 103b), or primary exhaust air 111 as a product of primary air 107 through engine 138.

A first portion of atmospheric air 103a is provided to air liquefier 112, which liquefies atmospheric air 103a into liquid air 105. Liquid air 105 is provided to dewar 114. Dewar 114 provides first and second portions of liquid air 105a, 105b to first and second cryo-mixing junctions 120, 122, respectively. Second and third portions of atmospheric air 103b, 103c are provided to first and second cryo-recuperators 132, 134, respectively. The first portion of liquid air 105a and the second portion of atmospheric air 103b are mixed in first cryo-mixing junction 120 to produce primary air 107, which has the temperature of liquid air 105a due to isothermal vaporization. The second portion of liquid air 105b and the third portion of atmospheric air 103c are mixed in second cryo-mixing junction 122 to produce secondary air 109, which has the temperature of liquid air 105b due to isothermal vaporization. Primary air 107 is compressed through first cryo-compressor 128 and provided to energy source 102. Secondary air 109 is compressed through second cryo-compressor 130 and provided to engine recovery heat exchanger 140. It is understood that, as illustrated, the provision of a fluid from one component to another may not always be direct. Primary air 107 may be provided from first cryo-compressor 128 to energy source 102 via first cryo-recuperator 132, for example.

Complimentary flow paths are fed by the cryogenic working fluid. A first fluid flow path begins with the entry of primary air 107 into energy source 102. Primary air 107 recovers heat from the energy source 102, continues on to engine 138 where it expands in the form of primary exhaust air 111; and continues on to engine recovery heat exchanger 140. The second fluid flow path begins with entry of secondary air 109 into engine recovery heat exchanger 140. Secondary air 109 recovers exhaust heat from primary exhaust air 111 in engine recovery heat exchanger 140; and continues on to engine driven generator 144 where it expands. The first and second fluid flow paths compliment and facilitate one another with their fluid heat exchange.

Engine driven generator 144 produces secondary exhaust air 113 and delivers power to electric regulator 146. As discussed below, in system 200, exhaust air 113 is circulated back to a first pre-heater 136 that is one of the at least one energy sources 102 in that embodiment. In FIG. 2b, exhaust air 113 is vented. Heat of secondary exhaust air 113 may be recovered for use, including recovery to an optional third flow path (not shown) fed by cryogenic working fluid and comprising a recovery heat exchanger and engine.

Electric regulator 146 provides power to at least air liquefier 112 and second cryo-compressor 130. As discussed below, in system 200, shown in FIG. 2a, electric regulator 146 also provides power to cryo-compressor 128, which is first electric driven cryo-compressor 156 in that embodiment. In system 300, shown in FIG. 2b, electric regulator 146 also receives power from energy source 102, which is second engine driven generator 170 in that embodiment. It is understood that the short dashed line pointing down and out from electric regulator 146 indicated net power output.

Now referring to FIG. 2a, a schematic of a preferred embodiment of the energy recovery system 100 of the present invention is provided. In this embodiment, system 200 is a heat recovery system for recovering energy of end product, exhaust, or circulating coolant from an originating heat source (in this case, primary heat source 150, discussed in more detail below). In system 200, first cryo-compressor 128 is first electric driven cryo-compressor 152. Second cryo-compressor 130 is second electric driven cryo-compressor 156. The engine 138 is first turbine driven generator 154. The engine driven generator 144 is second turbine driven generator 108. (Second turbine driven generator 108 is depicted in FIG. 2a as a rectangle, which is unlike how turbines are usually depicted in the figures herein. This depiction is to show consistency with FIGS. 1 and 2b.) This embodiment also includes a second pre-heater 142 disposed between engine recovery heat exchanger 140 and second cryo-recuperator 134. Electric regulator 146 provides power to first electric driven cryo-compressor 152 in this embodiment.

In system 200 the at least one energy source 102 includes first pre-heater 136 and primary heat source 150. First pre-heater 136 receives primary air 107 from first electric driven cryo-compressor 152 and heats primary air 107. Primary heat source 150 is preferably one of a fuel gasifier, nuclear reactor, fuel cell, or solar concentrator. Primary heat source 150 includes source recovery heat exchanger 158. A coolant 131 circulates between primary heat source 150 and source recovery heat exchanger 158 to transfer heat from source 150 to primary air 107. The coolant 131 may be a circulating exhaust gas, such as a combination of hydrogen, carbon monoxide, carbon dioxide and char of an air blown fuel gasifier, helium of a nuclear reactor, or steam coolant of a solar concentrator, for examples. Secondary exhaust air 113 is provided from second turbine driven generator 108 to first pre-heater 136 and the heat of secondary exhaust air 113 is used to heat primary air 107 therein.

System 200 also includes first and second liquid air pumps 160, 162 that receive first and second portions of liquid air 105a, 105b, respectively. First and second liquid air pumps 160, 162 pump first and second portions of liquid air 105a, 105b to first and second cryo-mixing junctions 120, 122, respectively. First storage valve 164 is disposed between air liquefier 112 and dewar 114 and controls a flow of liquid air 105 there-between. Second storage valve 166 controls a flow of liquid air 105 out of system 100. That is to say, that excess portions of liquid air 105 that are not used in the operation of system 100 may be removed from system 100 to storage (not shown) through second storage valve 166. As noted above, first and second portions of liquid air 105a, 105b, are used in the operation of system 100, which is why they are referenced separately from the liquid air 105 that leaves system 100 through second storage valve 166. Although not shown so as not to overly complicate the illustration, electric regulator 146 may provide power to first and second liquid air pumps 160, 162 and first and second storage valves 164, 166.

A first innovative feature of system 200 is recovery of heat from a high temperature external heat source 150 to energize first turbine driven generator 154 via source recovery heat exchanger 158 followed by recovery of exhaust heat from first turbine driven generator 154 to energize second turbine driven generator 108. First stage heat recovery from primary exhaust air 111 of first turbine driven generator 154 is shown and may be replicated in parallel flow relation by additional cascaded flow paths (not shown) at diminishing temperature. Such optional additional flow paths, fed by cryogenic working fluid, include a recovery heat exchanger and engine.

A second innovative feature is feed of liquid air 105 into first and second electric driven cryo-compressors 152, 156 via regulator 146. The mixture of liquid air 105 and cryo-cooled atmospheric air 103 is a cryogenic heat sink providing least compression work, to increase thermal efficiency of system 200.

In addition, an innovative operational feature, load shifting, provides liquid air 105 for cryo-compression. Relatively constant output at peak efficiency of system 200 is maintained during off-peak electric demand by shifting electric output of first and second turbine driven generators 154, 108 to liquefier 112 via regulator 146, as required. Advantages of load shifting are increased time-average thermal efficiency and reduced thermal transients.

Exemplary design point performance of the cryo-compression prime mover and air liquefier of FIG. 2a is described for recovery of heat from a high temperature [>427° C. (800° F.)] heat source to power an air turbine expansion system. The described turbine-generator arrangement will reduce minimum generating capacity of available micro-turbines from about 25 kWe to 12 kWe. The example is based on the lower end of micro-turbine-generator capacity range (~25 kWe to 500 kWe), in which small units have higher incidence of off-peak operation, and illustrates the effect of the parallel arrangement of the two turbine generators on rotor speed limit, which is inversely proportional to capacity. Micro-turbine-generators are used for distributed generation, however turbine-generators of the present invention also increase the capacity of large central station generators. Two-stage heat recovery is considered, rather than a more complex and higher performance, multi-stage secondary recovery system. Equivalent fuel consumption is reduced, as compared to a fully recuperated turbine driven generator with ambient intake air, due to efficient heat recovery combined with cryo-compression of the working fluid. Estimated thermal efficiency of the cryo-compression air turbine driven generators is 70%, or ~2.5 times as for other advanced recovery cycles. Cryo-compression alone reduces compression work of air turbines to about 14% of total generating capacity, as compared to 55% with ambient intake air. First turbine driven generator operating conditions are; pressure ratio=2.3 at air inlet temperature=838° C. (1540° F.) and rotor speed=100,000 rpm. Second turbine driven generator operating conditions are; pressure ratio=1.5 at air inlet temperature=615° C. (1140° F.) and rotor speed=100,000 rpm. Cryo-compressor inlet air temperature=−173° C. (−280° F.). Sufficient air is liquefied to meet the cryo-compression liquid air requirement of 2.6 kg/kWe (5.7 lb/kWe), based on an estimated specific power requirement of 1100 kJ/kg (475 Btu/lb) of an advanced air liquefier. Load shifting to the liquefier compressor during off-peak electric demand provides relatively constant turbine driven generator output at peak efficiency, in effect, reducing energy required for air liquefaction. In addition, thermal transients of system 100 are reduced.

Now referring to FIG. 2b, a schematic of an alternate preferred embodiment of the energy recovery system 100 of the present invention is provided. System 300 pressurizes atmospheric air 103 and directly recovers energy in the form of pressure and heat from the energy source 102, such as the fuel of a combustion engine or fuel cell. In system 300, electric output for motor vehicle prime mover application is generated via an internal combustion second engine driven generator 170.

In system 300, first cryo-compressor 128 is turbine driven cryo-compressor 168. Second cryo-compressor 130 is third electric driven cryo-compressor 282. (It is understood that this is the sole electric driven cryo-compressor in system 300, but has been designated the "third" so as to avoid confusion with first and second electric driven cryo-compressors 152, 156 in system 200). Engine 138 is compressor drive turbine 174. Engine driven generator 144 is reciprocating engine driven generator 176. Energy source 102 is second engine driven generator 170 with fuel supply 172. (Second engine driven generator 170 is a separate component from engine driven generator 144, which is reciprocating engine driven generator 176 in this embodiment.) Fuel supply 172 is preferably hydrogen.

In system 300, air liquefier 112 is the preferred air re-liquefier 288. Although air re-liquefier 288 is only shown in FIG. 2b, it is understood that air re-liquefier 288 may be used in any embodiment of system 100. Air re-liquefier 288 requires less energy to operate, as it does not have to process sensible heat and only absorbs and rejects the latent heat of the liquefying air to atmosphere. An example of a commercially sold air re-liquefier 288 is that sold under the trademark Cryomech, used for re-liquefying liquid nitrogen, the first stage coolant in production of liquid helium. An example of a commercially sold air liquefier 112 that does not include the additional benefits of air re-liquefier 288 is that sold under the trademark Nikkiso-Cosmodyne.

Unlike in system 200, in system 300 turbine driven cryo-compressor 168 is not powered by electric regulator 146. Instead, turbine driven cryo-compressor 168 and compressor drive turbine 174 are in mechanical communication such that rotation of their respective rotors is synchronized.

Like system 200, system 300 may also include first and second liquid air pumps 160, 162 and first and second storage valves 164, 166 that may be powered by electric regulator 146.

System 300 may include first and second cryo-air extraction junctions 278, 280; first and second liquefier valves 272, 274; and liquefier junction 276. First cryo-air extraction junction 278 is disposed between first cryo-recuperator 132, to which the second portion of atmospheric air 103b is provided, and first cryo-mixing junction 120.

A portion 227 of the second portion of atmospheric air 103b is extracted at first cryo-air extraction junction 278 so that not all of the second portion of atmospheric air 103b is provided to first cryo-mixing junction 120. Second cryo-air extraction junction 280 is disposed between second cryo-recuperator 134, to which a third portion of atmospheric air 103c is provided, and second cryo-mixing junction 122. A portion 229 of the third portion of atmospheric air 103c is extracted at second cryo-air extraction junction 280 so that not all of the third portion of atmospheric air 103c is provided to second cryo-mixing junction 122. First and second cryo-air extraction junctions 278, 280 are in fluid communication with liquefier junction 276. First liquefier valve 272 is disposed between first cryo-extraction junction 278 and liquefier junction 276 and controls a flow of portion 227 that is provided to liquefier junction 276. Second liquefier valve 274 is disposed between second cryo-extraction junction 280 and liquefier junction 276 and controls a flow of portion 229 that is provided to liquefier junction 276.

Portions 227, 229 of atmospheric air 103 are provided to air re-liquefier 288 for re-liquefaction. These additional components, first and second cryo-air extraction junctions 278, 280; first and second liquefier valves 272, 274, and liquefier junction 276, are required for extracting and re-liquefying the cryo-air. As such, their inclusion is necessary only when air liquefier 112 is air re-liquefier 288, as discussed above.

Complimentary fluid flow paths are fed by the cryogenic working fluid. A first fluid flow path begins with the entry of primary air 107 into engine driven generator 170, where primary air 107 supports combustion of fuel from fuel supply 172. Primary air 107 is heated and expelled from engine driven generator 170 as primary exhaust air 111; continues on to compressor drive turbine 174 where it expands; continues on to engine recovery heat exchanger 140 in the form of primary exhaust air 111; and is exhausted from engine recovery heat exchanger 140 in the form of primary exhaust air 111. The second fluid flow path begins with entry of secondary air 109 into engine recovery heat exchanger 140. Secondary air 109 recovers exhaust heat from primary exhaust air 111 in engine recovery heat exchanger 140; and continues on to reciprocating engine driven generator 176 where it expands and is exhausted as secondary exhaust air 113. The first and second fluid flow paths compliment and facilitate one another with their fluid heat exchange.

The first innovative feature of system 300 is recovery of engine exhaust gas pressure to drive turbine driven cryo-compressor 168 followed by recovery of exhaust heat from compressor drive turbine 174 via engine recovery heat exchanger 140 to energize reciprocating engine driven generator 176. First stage heat recovery from primary air 111 discharging from compressor drive turbine 174 is shown, which may be replicated in parallel flow relation by additional cascaded flow paths (not shown) at diminishing temperature. Such optional additional flow paths, fed by cryogenic working fluid, would include a pre-heater, recovery heat exchanger and engine.

A second innovative feature is feed of liquid air 105 into cryo-compressors 128, 130 via regulator 146. The mixture of liquid air 105 and cryo-cooled atmospheric air 103 is a cryogenic heat sink providing least compression work, to increase thermal efficiency of system 300.

A third innovative feature is recirculation and extraction of a portion of cryo-working fluid to re-liquefier 288. Re-liquefaction enables rejection to atmosphere of only the latent heat of the extracted air 227 and 229 at saturation temperature of cryo-compression, thus eliminating rejection of sensible heat and reducing the specific energy requirement of liquefaction.

In addition, an innovative operational feature, constant load, combines engine driven generator load and liquefier load to store and dispense liquid air 205 during highway driving. Regenerative braking is sufficient to meet liquid air demand during urban driving. Higher engine driven generator efficiency with constant load operation supports the added re-liquefier power requirement. Advantages of constant load operation are increased time-average thermal efficiency and reduced thermal transients.

Exemplary design point performance of the cryo-compression combustion engine/air re-liquefier of FIG. 2 is described for recovery of heat and pressure from engine exhaust to engine intake air and to a single stage reciprocating engine. Only single stage heat recovery is considered for motor vehicle application, rather than a more complex and higher performance multi-stage recovery system.

Fuel consumption is reduced as compared to a turbocharged internal combustion engine with ambient intake air, due to efficient heat recovery and cryo-compression of the working fluid. Estimated peak liquid air consumption is based on net power output of a 1590 kg (3500 lb) car at highway speed of 120 km/h (75 mph). Equivalent gasoline mileage and liquid air consumption at this speed=18.7 km/L (44 mpg) and 16 lb liquid air/lb $H_2$, respectively. Engine operating conditions are: net power output=30 HP, compression ratio=10, excess air ratio=1.0, exhaust temperature=615° C. (1140° F.) at 6500 rpm and pressure ratio to the turbine driven cryo-compressor=2 at 200,000 rpm. Reciprocating engine operating conditions are: pressure ratio=20 at air inlet temperature=560° C. (1040° F.) at 6500 rpm. Thermal efficiency of the spark ignition engine at 120 km/h (75 mph) is increased from ~25% to ~45% with cryo-compression and exhaust heat recovery. It is estimated that addition of a second recovery flow path would increase overall efficiency to 60%. Sufficient air is re-liquefied to meet the cryo-compression requirement based on regenerative braking in an urban driving cycle. For the highway driving cycle, higher engine driven generator efficiency due to combined load with the re-liquefier, supports the re-liquefier power requirement, while excess liquefied air is held in storage. Re-liquefaction improves the specific power requirement of air from 0.77 kWh/kg (1200 Btu/lb) liquefied to 0.52 kWh/kg (800 Btu/lb) re-liquefied.

Figure 3:
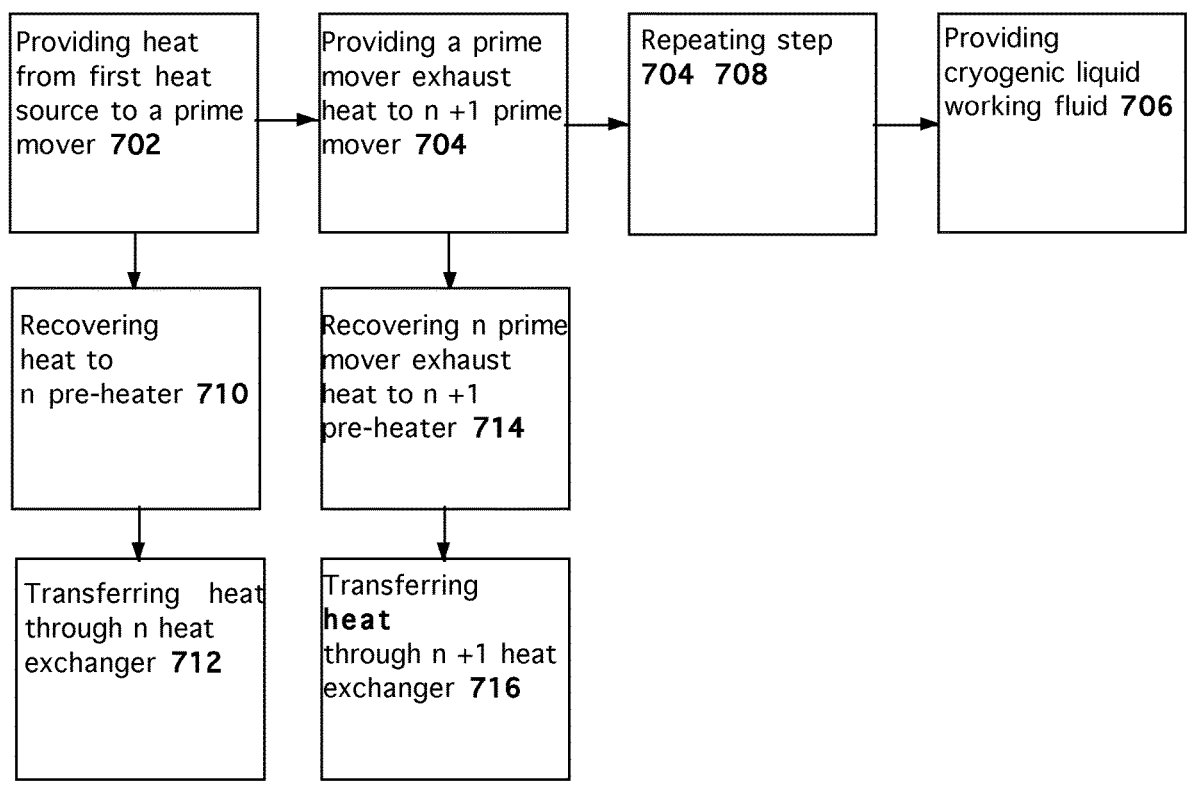
FIG. 3 is a block diagram of the steps of the method of the present invention.

Now referring to FIG. 3, a block diagram illustrating the steps of the method of the present invention is provided. Understanding system 100 and its preferred embodiments of systems 200 and 300, one of at least ordinary skill in the art will recognize that method 700 that is a method for cascaded energy recovery inherent in the operations of these systems. In its most basic form, the steps of method 700 are providing heat generated by a first heat source to an n prime mover 702, wherein the n prime mover generates n prime mover exhaust heat when the heat is provided from the first heat source to the n prime mover; providing all of the n prime mover exhaust heat to an n+1 prime mover 704, wherein the n+1 prime mover generates n+1 prime mover exhaust heat, and wherein steps 702 and 704 are achieved through fluid flow between the first heat source, the n prime mover, and the n+1 prime mover; and 706 providing cryogenic liquid working fluid to feed the fluid flow, wherein the cryogenic liquid working fluid provides cryogenic compression of working fluid to each of the prime movers. As used in reference to method 700, n=first; n+1=second; n+2=third; etc . . . .

As used herein, when it is said that "all of the n prime mover exhaust heat" is provided, it is understood that as much of the n prime mover exhaust heat as practically possible is provided to the n+1 prime mover, while also understanding that no heat transfer is perfect heat transfer. That is to say, none of the heat is sequestered to storage or another application. Any use of heat exchangers in the present method, as described below is not for use to store the heat but only to facilitate the immediate provision of the heat from an n prime mover to an n+1 prime mover. In order to minimize heat loss, the step of providing the n prime mover exhaust heat occurs immediately upon the generation of the n prime mover exhaust heat. As such, when "all of the n prime mover exhaust heat" is provided in step b), it is understood that the n prime mover heat is fully and immediately provided to the n+1 prime mover until all the exhaust heat is depleted and insufficient to cause the next prime mover to generate prime exhaust heat.

It is preferred that the method also include the step of repeating step 704 until the n prime mover exhaust heat is insufficient to cause the n+1 prime mover to generate n+1 prime mover exhaust heat 708, wherein on each execution of this repeating step, n increases by 1. In other words, exhaust heat from the first prime mover is provided to the second prime mover. Exhaust heat from the second prime mover is provided to the third prime mover. Exhaust heat from the third prime mover is provided to the fourth prime mover, etc . . . . This continues until the n prime mover cannot provide sufficient heat to the n+1 prime mover for the nth+1 prime mover to generate its own exhaust heat. In this way, the original heat generated by the first heat source is used as fully as possible.

In preferred embodiments, the step 702 of providing heat generated by a first heat source to an n prime mover includes the steps of recovering the heat to an n pre-heater 710 and transferring the heat to the n prime mover through an n heat exchanger 712. In this preferred embodiment the step 704 of providing all of the n prime mover exhaust heat to an n+1 prime mover includes the steps of recovering n prime mover exhaust heat to an n+1 pre-heater 714 and transferring the n prime mover exhaust heat to the n+1 prime mover through an n+1 heat exchanger 716.

As described above, with reference to the systems of the present invention, the first heat source is preferably a fuel gasifier, a nuclear reactor, fuel cell, or a solar concentrator. Also as described above with reference to the systems of the present invention, the prime movers may be: generally, engine 138 and engine driven generator 144 (as shown in FIG. 1) or, specifically first and second turbine driven generators 154, 108 (as shown in FIG. 2a) or compressor drive turbine 174 and reciprocating engine driven generator 176 (as shown in FIG. 2b). The n prime mover (or first prime mover) may also be a fuel cell. Also as described above with reference to the systems of the present invention, the steps of providing heat or exhaust heat are preferably achieved through heat exchangers, and preferably through recovery heat exchangers, such as heat exchanger 140 shown in FIGS. 1, 2a, and 2b, and supplementary heat exchangers, such as pre-heaters 136, 142, shown in FIGS. 1, 2a, and 2b, which conserve excess exhaust heat by transfer from exhaust air 111 to secondary air 109.

As described above, the method of the present invention includes a parallel cascade of prime movers and heat exchangers. The parallel cascade is intended to maximize heat recovery and thermal efficiency. Thus, working fluid pressure is fully discharged through a prime mover of each stage and heat downstream of each prime mover is recovered, in turn, to a recovery heat exchanger and a pre-heater. Each recovery heat exchanger is limited to recovering not more heat than is dissipated by its upstream prime mover, as determined by heat balance, while each pre-heater recovers the remaining heat. The present method's parallel cascade is to be compared with a series cascade, such as that disclosed in U.S. Patent Publication No. 2020/0400372 with first named inventor Nicola Castellucci (hereinafter, "Castellucci"). In a series cascade, working fluid pressure is reduced stepwise through a series of prime movers while heat is recovered to storage via heat exchangers between prime movers, in accordance with system load variation. With the present method, as discussed above, heat is not recovered to storage but is immediately and fully provided to the next prime mover.

Now referring to FIG. 4, a schematic illustrating an exemplary preferred embodiment of the present invention of an air re-liquefaction system 400 is provided. Power to re-liquefaction system 400 is from a prime mover 402, while latent heat of the working fluid is rejected to atmosphere prior to cryo-compression. Cryo-compression refers to quasi-isothermal compression of a mixture of liquid air 405 and cooled atmospheric air 401 at vaporization temperature of the liquid air 405, thus minimizing compression work of the working fluid. System 400 provides prime mover intake air 403, which is a mixture of atmospheric intake air 401 and liquid air 405, to prime mover 402. Fuel 407, which is preferably hydrogen or methane, is provided to prime mover 402. Prime mover 402 then discharges exhaust products of a fuel 407 as exhaust gas 411. As described above in more detail with reference to method 700, the heat of exhaust gas 411 may then be transferred to the prime mover intake air 403 to drive another prime mover in a cascade.

Re-liquefying system 400 includes prime mover 402; active magnetic regenerative re-liquefier 488, including active magnetic regenerator (AMR) matrix 442 with a magnetically responsive material, such as magneto-caloric mesh 414, electric driven rotating magnet 444, absorption heat exchanger 446, rejection heat exchanger 448, and isolation valves 404, 406, 408, 410; heat absorption flow path 416, including cryo-recuperator 490, cryo-mixing junction 418, absorption heat exchanger 446 (a common component to both AMR re-liquefier 488 and absorption flow path 416), dewar 420, and preferably liquid air pump 434 and air extraction valve 436; turbo-charger 426, which includes drive-turbine 430 and liquefier compressor 424; heat rejection flow path 422, including liquefier compressor 424 (of drive-turbine 430), after-cooler 450, rejection flow path heat exchanger 800 which is sub-ambient heat exchanger 428, cryo-expander 452, and rejection heat exchanger 448 (a common component to both AMR re-liquefier 488 and rejection flow path 422); cryo-motor compressor 438; and electric regulator 432.

Valve 404 is the outlet valve of rejection heat exchanger 448. Valve 406 is the outlet valve of absorption heat exchanger 446. Valve 408 is the inlet valve of rejection heat exchanger 448. Valve 410 is the inlet valve of absorption heat exchanger 446. Dewar 420 stores excess of liquid air 405 and make-up liquid air 419, as required. The crossed box indicating electric driven rotating magnet 444 is shown on either side of AMR matrix 442 to indicate the rotation of electric driven rotating magnet 444 around AMR matrix 442.

Re-liquefaction of liquid air 405 is preferably by a single-stage AMR re-liquefier 488. The re-liquefaction system 400 includes heat absorption and first stage heat rejection via the active magnetic regenerative re-liquefier 488, as well as the rejection flow path 422, to reject the absorbed heat to atmosphere. AMR re-liquefier 488 alternately absorbs and rejects latent heat of the working fluid via an internal AMR fluid 491, which is under control of four AMR isolation valves 404, 406, 408, 410. AMR fluid 491 is preferably helium. The magneto-caloric effect produces temperature lift by circulation of AMR fluid 491 through a magnetically responsive material in a magnetic field, in response to a quasi-adiabatic change of the field. Preferred examples of the magnetically responsive material are magneto-caloric meshes 414 of compounds of gadolinium or erbium. As will be recognized by one of at least ordinary skill in the art, the preferred single-stage AMR re-liquefier 488 may be effectively substituted with a multi-stage AMR, a thermo-acoustic liquefier/re-liquefier, or other related devices.

In some embodiments of the present invention, re-liquefier 488, including AMR matrix 442 with a magnetically responsive material, such as magneto-caloric mesh 414, electric driven rotating magnet 444, absorption heat exchanger 446, rejection heat exchanger 448, isolation valves 404, 406, 408, 410 may be used as air liquefier 112, as shown in FIGS. 1 and 2a or as air re-liquefier 288, as shown in FIG. 2b.

Flow of air is described during simultaneous and relatively constant operation of prime mover 402 and re-liquefier 488. Composition of the prime mover working fluid varies through system 400 from atmospheric intake air 401 to exhaust gas 411.

A flow of working fluid and its heat absorption in absorption flow path 416 is as follows: Atmospheric intake air 401 is cryogenically cooled by prime mover intake air 403 in cryo-recuperator 490. The cryogenically cooled atmospheric intake air 401 is provided to cryo-mixing junction 418. Liquid air 405 is pumped by liquid air pump 434 from dewar 420 to cryo-mixing junction 418. Cryo-mixing junction 418 mixes intake air 401 and liquid air 405 to create prime mover intake air 403 and absorption air 413. Prime mover intake air 403 is compressed in cryo-motor-compressor 438; gains heat from atmospheric intake air 401 in cryo-recuperator 490; and is provided to prime mover 402. Latent heat of absorption air 413 is transferred to re-liquefier through absorption heat exchanger 446 under control of valve 436.

Heat rejection is by temperature rise induced by re-liquefier 488 to rejection flow path 422. A flow of working fluid and its heat rejection in rejection flow path 422 is as follows: Atmospheric intake air 401 becomes heat rejection air 415 after compression in liquefier compressor 424. Liquefier compressor 424 is part of turbo-charger 426, which is driven by pressure of exhaust gas 411 from prime mover 402 via drive-turbine 430, which is also a part of turbo-charger 426. Heat rejection air 415 is then cooled, in turn, in after-cooler 450 by cooling water 417; in sub-ambient heat exchanger 428 by returning heat rejection air 415; and by expansion in cryo-expander 452. Temperature lift by the magneto-caloric effect of re-liquefier 488 enables transfer of the absorbed latent heat of re-liquefying absorption air 413 to heat rejection air 415 via rejection heat exchanger 448. Rejection air 415 continues to gain heat through liquefier sub-ambient heat exchanger 428 and discharges to atmosphere.

The magneto caloric cycle includes four valve controlled stages, in turn; magnetization, heat rejection, de-magnetization, and heat absorption, as follows:

1. With no flow through regenerator matrix 442 and a magnetic field generated by rotation of magnet 444 about the magneto-caloric mesh 414, temperature of the heat transfer fluid 491 increases by the magneto-caloric induced temperature difference;
2. Heat transfer fluid 491 enters regenerator matrix 442 from the outlet valve 406 of absorption heat exchanger 446, is heated in matrix 442 by the magneto-caloric mesh 414, and continues from matrix 442 through the inlet valve 408 of rejection heat exchanger 448;
3. With no flow through matrix 442 and with matrix 442 demagnetized, temperature of mesh 414 decreases by the magneto-caloric induced temperature difference;
4. The heat transfer fluid 491 enters matrix 442 from the outlet valve 404 of rejection heat exchanger 448, is cooled by the previously cooled regenerator matrix 442, and continues through the inlet valve 410 of absorption heat exchanger 446.

Electric regulator 432 facilitates power transfer among the various system 400 components. Prime mover 402 provides power to electric regulator 432. Electric regulator 432 provides power to cryo-motor-compressor 438, valves 404, 406, 408, 410, and rotating magnet 444. Although not shown, it is understood that electric regulator 432 also provides power to liquid air pump 434 and air extraction valve 436. Excess power may be exported from electric regulator 432 to other applications.

A first innovative feature of system 400 is rejection of latent heat of re-liquefying absorption air 413 from magneto-caloric re-liquefier 488 to atmosphere via rejection flow path 422. Advantages of this feature are operation of system 400 at low pressure ratio, as compared to a compression-expansion liquefier, while overcoming limited single stage temperature lift of the AMR re-liquefier 488.

A second innovative feature of system 400 is use of a high speed turbo-charger 426 to provide pressurized heat rejection air 415 to heat rejection flow path 422, thus realizing the potential of recovered energy of prime mover exhaust pressure to power air liquefaction. An advantage of this feature is higher speed of turbo-charger 426, as compared to speed limited electric compressor drive for pressure recovery of prime mover exhaust gas 411. As a result, more power is available to drive compressor 424 of turbo-charger 426, delivering increased liquid air 405.

A third innovative feature is re-liquefaction of liquid air 405, which further reduces required work input to liquefier compressor 424 and to AMR re-liquefier 488. Reduced liquefier work input in this highway driving application is from the high speed turbo-charger 426, but may be supplemented for more general driving application by recovery of regenerative braking. In addition, load shifting via regulator 432 increases time-average thermal efficiency of system 400 while reducing thermal transients.

Exemplary design point performance of a cryo-compression engine operating in conjunction with the air re-liquefier of FIG. 4 of the present invention is described for recovery of heat and pressure from engine exhaust to engine intake air. With engine net power output=30 HP at 121 km/h (75 mph), pressure ratio of the turbine driven liquefier compressor=4 and liquid air consumption=32 kg/h (70 lb/h). The re-liquefaction energy requirement is about 50% as compared with re-liquefaction with the best compression-expansion liquefier available.

Worst case liquid air output of the re-liquefier is during operation of a compact car in a long distance highway driving cycle. This is because the only recoverable energy source to drive re-liquefaction is from engine exhaust while turbo-charger speed is limited in inverse proportion to engine power. Turbo-chargers in large vehicles are not speed limited and stationary applications have other recoverable energy sources including solar, wind, etc. Estimation of liquid air consumption assumes that a compact car starts out with a supply of 91 kg (200 lb) of liquid air and continues at 121 km/h (75 mph) with 10% regenerative braking and with turbo-charger speed limited to 200,000 rpm. The most efficient engine with least liquid air consumption for this application is a solid oxide fuel cell. Single stage exhaust recovery is considered for motor vehicle application, rather than a more complex and higher performance multi-stage recovery system.

Now referring to FIG. 5, a schematic illustrating an alternate exemplary preferred embodiment of the present invention of an air re-liquefaction system 500 is provided. Power to re-liquefaction system 500 is from a prime mover 502, while latent heat of the working fluid is rejected to atmosphere prior to cryo-compression. Cryo-compression refers to quasi-isothermal compression of a mixture of liquid air 505 and cooled atmospheric air 501 at vaporization temperature of the liquid air 505, thus minimizing compression work of the working fluid. System 500 provides prime mover intake air 503, which is a mixture of atmospheric intake air 501 and liquid air 505, to prime mover 502. Fuel 507, which is preferably hydrogen or methane, is provided to prime mover 502 from fuel tank 556. Prime mover 502 then discharges exhaust products of fuel 507 as exhaust gas 511. As described above in more detail with reference to method 700, the heat of exhaust gas 511 may then be provided to another prime mover in a cascade.

Re-liquefying system 500 includes prime mover 502; AMR re-liquefier 588, including AMR matrix 542 with a magnetically responsive material, such as magneto-caloric mesh 514, electric driven rotating magnet 544, absorption heat exchanger 546, rejection heat exchanger 548, isolation valves 504, 506, 508, 510; heat absorption flow path 516, including cryo-recuperator 590, cryo-mixing junction 518, absorption heat exchanger 546 (a common component to both AMR re-liquefier 588 and absorption flow path 516), dewar 520, and preferably liquid air pump 534 and air extraction valve 536; turbo-charger 526, which includes drive-turbine 530 and liquefier compressor 524; heat rejection flow path 522, including liquefier compressor 524 (of drive-turbine 530), after-cooler 550, rotary regenerator 554, rejection flow path heat exchanger 800 which is supplementary cooler 558, cryo-expander 552, and rejection heat exchanger 548 (a common component to both AMR re-liquefier 588 and rejection flow path 522); cryo-motor compressor 538; and electric regulator 532.

Valve 504 is the outlet valve of rejection heat exchanger 548. Valve 506 is the outlet valve of absorption heat exchanger 546. Valve 508 is the inlet valve of rejection heat exchanger 548. Valve 510 is the inlet valve of absorption heat exchanger 546. Dewar 520 stores excess of liquid air 505 and make-up liquid air 519, as required. The crossed box indicating electric driven rotating magnet 544 is shown on either side of AMR matrix 542 to indicate the rotation of electric driven rotating magnet 544 around AMR matrix 542. Fuel tank 556 supplies fuel 507 to prime mover 502 via supplementary cooler 558.

In both system 400 shown in FIG. 4 and system 500 shown in FIG. 5, there is a rejection flow path heat exchanger 800 between after-cooler 450/550 and cryo-expander 452/552. In system 400, rejection flow path heat exchanger 800 is sub-ambient heat exchanger 428 and sub-ambient heat exchanger 428 is the only component between after-cooler 450 and cryo-expander 452. In system 500, rejection flow path heat exchanger 800 is supplementary cooler 558. In system 500, rotary regenerator 554 and supplementary cooler 558 are between after-cooler 550 and cryo-expander 552. For the avoidance of doubt, rejection flow path heat exchanger 800 is a separate component from rejection heat exchanger 448/548.

Re-liquefaction of liquid air 505 is preferably by a single-stage AMR re-liquefier 588. The re-liquefaction system 500 includes heat absorption and first stage heat rejection via the active magnetic regenerative re-liquefier 588, as well as the rejection flow path 522, to reject the absorbed heat to atmosphere. AMR re-liquefier 588 alternately absorbs and rejects latent heat of the working fluid via an internal AMR fluid 591, which is under control of four AMR isolation valves 504, 506, 508, 510. AMR fluid 591 is preferably helium. The magneto-caloric effect produces temperature lift by circulation of AMR fluid 591 through a magnetically responsive material in a magnetic field, in response to a quasi-adiabatic change of the field. Preferred examples of the magnetically responsive material are magneto-caloric meshes 514 of compounds of gadolinium or erbium. As will be recognized by one of at least ordinary skill in the art, the preferred single-stage AMR re-liquefier 588 may be substituted with a multi-stage AMR, a thermo-acoustic liquefier/re-liquefier, or other related devices.

Flow of air is described during simultaneous and relatively constant operation of prime mover 502 and re-liquefier 588. Composition of the prime mover working fluid varies through system 500 from atmospheric intake air 501 to exhaust gas 511.

A flow of working fluid and its heat absorption in absorption flow path 516 is as follows: Atmospheric intake air 501 is cryogenically cooled by prime mover intake air 503 in cryo-recuperator 590. The cryogenically cooled atmospheric intake air 501 is provided to cryo-mixing junction 518. Liquid air 505 is pumped by liquid air pump 534 from dewar 520 to cryo-mixing junction 518. Cryo-mixing junction 518 mixes intake air 501 and liquid air 505 to create prime mover intake air 503 and heat absorption air 513. Prime mover intake air 503 continues on to prime mover 502 via cryo-motor-compressor 538 and cryo-recuperator 590, as required. Latent heat of heat absorption air 513 is transferred to re-liquefier 588 through absorption heat exchanger 546 under control of valve 536.

Heat rejection is by temperature rise induced by re-liquefier 588 to rejection flow path 522. A flow of working fluid and its heat rejection in rejection flow path 522 is as follows: Atmospheric intake air 501 becomes heat rejection air 515 after compression in liquefier compressor 524. Liquefier compressor 524 is part of turbo-charger 526, which is driven by pressure of exhaust gas 511 from prime mover 502 via drive-turbine 530, which is also a part of turbo-charger 526. Heat rejection air 515 is then cooled, in turn, in after-cooler 550 by cooling water 517; in rotary regenerator 554 by returning heat rejection air 515; in supplementary cooler 558; and by expansion in cryo-expander 552. Temperature lift by the magneto-caloric effect of re-liquefier 588 enables transfer of the absorbed latent heat of re-liquefying absorption air 513 to heat rejection air 515 via rejection heat exchanger 548. Rejection air 515 continues to gain heat through liquefier rotary regenerator 554 and discharges to atmosphere. Fuel 507 from fuel tank 556 is heated in supplementary cooler 558 by the cooling of heat rejection air 515, before being provided to prime mover 502.

The magneto caloric cycle includes four valve controlled stages, in turn; magnetization, heat rejection, de-magnetization, and heat absorption, as follows:

1. With no flow through regenerator matrix 542 and a magnetic field generated by rotation of magnet 544 about the magneto-caloric mesh 514, temperature of the heat transfer fluid 591 increases by the magneto-caloric induced temperature difference;
2. Heat transfer fluid 591 enters regenerator matrix 542 from the outlet valve 506 of absorption heat exchanger 546, is heated in matrix 542 by the magneto-caloric mesh 514, and continues from matrix 542 through the inlet valve 508 of rejection heat exchanger 548;
3. With no flow through matrix 542 and with matrix 542 demagnetized, temperature of mesh 514 decreases by the magneto-caloric induced temperature difference;
4. The heat transfer fluid 591 enters matrix 542 from the outlet valve 504 of rejection heat exchanger 548, is cooled by the previously cooled regenerator matrix 542, and continues through the inlet valve 510 of absorption heat exchanger 546.

Electric regulator 532 facilitates power transfer among the various system 500 components. Prime mover 502 provides power to electric regulator 532. Electric regulator 532 provides power to cryo-motor-compressor 538, valves 504, 506, 508, 510, and rotating magnet 544. Although not shown, it is understood that electric regulator 532 also provides power to liquid air pump 534 and air extraction valve 536. Excess power may be exported from electric regulator 532 to other applications.

A first innovative feature of system 500 is rejection of latent heat of re-liquefying absorption air 513 from magneto-caloric re-liquefier 588 to atmosphere via rejection flow path 522. Advantages of this feature are operation of system 500 at low pressure ratio, as compared to a compression-expansion liquefier, while overcoming limited single stage temperature lift of the AMR re-liquefier 588.

A second innovative feature of system 500 is use of a high speed turbo-charger 526 to provide pressurized heat rejection air 515 to heat rejection flow path 522, thus realizing the potential of recovered energy of prime mover exhaust pressure to power air liquefaction. An advantage of this feature is higher speed of turbo-charger 526, as compared to speed limited electric compressor drive for pressure recovery of prime mover exhaust gas 511. As a result, more power is available to drive compressor 524 of turbo-charger 526, delivering increased liquid air 505.

A third innovative feature is re-liquefaction of liquid air 505, which further reduces required work input to liquefier compressor 524 and to AMR re-liquefier 588. Reduced liquefier work input in this highway driving application is from the high speed turbo-charger 526, but may be supplemented for more general driving application by recovery of regenerative braking. In addition, load shifting via regulator 532 increases time-average thermal efficiency of system 500 while reducing thermal transients.

A fourth innovative feature is use of cryo-fuel to provide supplementary cooling of heat rejection air 515, which further reduces required pressure of air 515 and enables employment of rotary regenerator 554 with higher effectiveness than an alternate recuperative heat exchanger.

Exemplary design point performance of a cryo-compression engine operating in conjunction with the air re-liquefier of FIG. 5 of the present invention is described for recovery of heat and pressure from engine exhaust to engine intake air. With engine net power output=30 HP at 121 km/h (75 mph), pressure ratio of the turbine driven liquefier compressor=2 and liquid air consumption=32 kg/h (70 lb/h). The re-liquefaction energy requirement with pre-cooling by hydrogen fuel is equivalent to about 30% as compared with re-liquefaction with the best compression-expansion liquefier available.

Worst case liquid air output of the re-liquefier is during operation of a compact car in a long distance highway driving cycle. This is because the only recoverable energy source to drive re-liquefaction is from engine exhaust while turbo-charger speed is limited in inverse proportion to engine power. Turbo-chargers in large vehicles are not speed limited and stationary applications have other recoverable energy sources including solar, wind, etc. Estimation of liquid air consumption assumes that a compact car starts out with a supply of 91 kg (200 lb) of liquid air and continues at 121 km/h (75 mph) with 10% regenerative braking and with turbo-charger speed limited to 200,000 rpm. The most efficient engine with least liquid air consumption for this application is a solid oxide fuel cell. Single stage exhaust recovery is considered for motor vehicle application, rather than a more complex and higher performance multi-stage recovery system.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. An air re-liquefaction system comprising:
a prime mover that uses a fuel and generates exhaust gas;
a re-liquefier comprising:
   an active regenerator matrix;
   an electric driven rotating magnet that rotates around said active regenerator matrix;
   an absorption heat exchanger;
   a rejection heat exchanger;
   inlet and outlet valves of said absorption heat exchanger; and
   inlet and outlet valves of said rejection heat exchanger;
a turbo-charger comprising a drive-turbine and a liquefier compressor;
an absorption flow path comprising:
   a cryo-recuperator;
   a cryo-mixing junction;
   a liquid air dewar that stores liquid air; and
   said absorption heat exchanger of said re-liquefier;
a rejection flow path comprising:
   said liquefier compressor of said turbo-charger;
   an after-cooler;
   a rejection flow path heat exchanger; a cryo-expander; and
   said rejection heat exchanger of said re-liquefier;
a cryo-motor-compressor; and
an electric regulator, wherein said electric regulator receives power from said prime mover and provides power to at least:
   said cryo-motor-compressor;
   said electric driven rotating magnet of said re-liquefier; and
   said inlet and outlet valves of said absorption and rejection heat exchangers;
wherein:
   pressure of the exhaust gas generated by said prime mover drives said liquefier compressor of said turbo-charger through said drive-turbine of said turbo-charger;
   said re-liquefier absorbs and rejects heat through an internal fluid under control of said inlet and outlet valves of said absorption and rejection heat exchangers;
   within said absorption flow path:
      atmospheric intake air enters said air re-liquefaction system and is cryogenically cooled in said cryo-recuperator;
      the cryogenically cooled atmospheric intake air is provided to said mixing junction;
      liquid air from said liquid air dewar is also provided to said cryo-mixing junction;
      said cryo-mixing junction mixes the cryogenically cooled atmospheric intake air and the liquid air and produces prime mover intake air and absorption air;
      the prime mover intake air is:
         provided to said cryo-motor-compressor and compressed;
         heated in said cryo-recuperator; and
         provided to said prime mover;
      the absorption air is provided to said absorption heat exchanger of said re-liquefier, thereby transferring latent heat of the absorption air to said re-liquefier; and
      the absorption air is then provided to said liquid air dewar as liquid air; and
   within said rejection flow path:
      atmospheric intake air enters said air re-liquefaction system and is compressed in said liquefier compressor of said turbo-charger into heat rejection air;
      the heat rejection air is further cooled in said after-cooler;
      the heat rejection air is further cooled in said rejection flow path heat exchanger;
      the heat rejection air is further cooled by expansion in said cryo-expander;
      the heat rejection air is provided to said rejection heat exchanger of said re-liquefier, where temperature lift by a magneto-caloric effect of said re-liquefier enables transfer of latent heat of the absorption air to heat the heat rejection air; and
      the heat rejection air is heated in said rejection flow path heat exchanger and discharged to atmosphere.

2. The air re-liquefaction system as claimed in claim 1, wherein said re-liquefier is a single-stage active magnetic regenerative re-liquefier.

3. The air re-liquefaction system as claimed in claim 1, wherein said active regenerator matrix of said re-liquefier is comprised of a magnetically responsive material.

4. The air re-liquefaction system as claimed in claim 3, wherein said magnetically responsive material is a magneto-caloric mesh.

5. The air re-liquefaction system as claimed in claim 4, wherein said magneto-caloric mesh is one of a group consisting of a mesh of a gadolinium compound and a mesh of an erbium compound.

6. The air re-liquefaction system as claimed in claim 1, wherein said rejection flow path heat exchanger is a sub-ambient heat exchanger.

7. The air re-liquefaction system as claimed in claim 1, wherein:
said rejection flow path heat exchanger is a supplementary cooler;
said rejection flow path further comprises a rotary regenerator disposed between said after-cooler and said supplementary cooler, such that the heat rejection air is provided from said after-cooler to said rotary regenerator and said supplementary cooler for further cooling; and
said air re-liquefaction system further comprises a fuel tank that supplies the fuel that gains heat in said supplementary cooler and is then provided to said prime mover.

8. The air re-liquefaction system as claimed in claim 1, wherein said absorption flow path further comprises:
a liquid air pump that pumps the liquid air from said liquid air dewar to said cryo-mixing junction; and
an air extraction valve that controls a flow of the absorption air between said cryo-mixing junction and said absorption heat exchanger;
wherein said electric regulator further provides power to said liquid air pump and said air extraction valve.

9. The air re-liquefaction system as claimed in claim 1, wherein the internal fluid of said re-liquefier is helium.

10. The air re-liquefaction system as claimed in claim 1, wherein said after-cooler of said rejection flow path cools via a source of cooling water.

11. A method for cascaded energy recovery, said method comprising the steps of:
   a) providing heat generated by a first heat source to an n prime mover, wherein the n prime mover generates n prime mover exhaust heat when the heat is provided from the first heat source to the n prime mover, said step a) comprising the steps of:
      recovering the heat to an n pre-heater; and
      transferring the heat to the n prime mover through an n heat exchanger;
   b) providing all of the n prime mover exhaust heat to an n+1 prime mover, wherein the n+1 prime mover generates n+1 prime mover exhaust heat, and wherein said steps a) and b) are achieved through fluid flow between the first heat source, the n prime mover, and the n+1 prime mover, said step b) comprising the steps of:
      recovering the n prime mover exhaust heat to an n+1 pre-heater; and
      transferring the n prime mover exhaust heat to the n+1 prime mover through an n+1 heat exchanger;
   c) providing cryogenic liquid working fluid to feed the fluid flow, wherein the cryogenic liquid working fluid provides cryogenic compression of working fluid to each of the prime movers.

12. The method as claimed in claim 11, further comprising the step of repeating said step b) until the n prime mover exhaust heat is insufficient to cause the n+1 prime mover to generate n+1 prime mover exhaust heat, wherein on each execution of said step of repeating, n increases by 1.

13. The method as claimed in claim 11, wherein the first heat source is one of a group consisting of a fuel gasifier, a nuclear reactor, a solar concentrator, and a fuel cell.

14. The method as claimed in claim 11, wherein said step of providing heat generated by the first heat source to the n prime mover is achieved through a heat exchanger.

15. The method as claimed in claim 11, wherein said step of providing all of the n prime mover exhaust heat to the n+1 prime mover is achieved through a heat exchanger.

16. The method as claimed in claim 11, wherein the n prime mover is one of a group consisting of an expansion engine, a turbine driven generator, a reciprocating engine driven generator, a compressor drive turbine, and a fuel cell.

17. The method as claimed in claim 11, wherein the n+1 prime mover is one of a group consisting of an expansion engine, engine driven generator, a turbine driven generator, a reciprocating engine driven generator, and a compressor drive turbine.

* * * * *